INVENTOR.
CHARLES J. KOESTER
BY
ATTORNEY

Feb. 4, 1969  C. J. KOESTER  3,426,294
LASER Q-SWITCHING

Filed Feb. 10, 1965  Sheet 2 of 3

INVENTOR.
CHARLES J. KOESTER
BY J. Albert Hultquist
ATTORNEY

INVENTOR.
CHARLES J. KOESTER

United States Patent Office 3,426,294
Patented Feb. 4, 1969

3,426,294
LASER Q-SWITCHING
Charles J. Koester, South Woodstock, Conn., assignor to American Optical Corporation, a corporation of Delaware
Filed Feb. 10, 1965, Ser. No. 431,573
U.S. Cl. 331—94.5    20 Claims
Int. Cl. H01s 3/00; G02b 17/00; G02f 1/30

ABSTRACT OF THE DISCLOSURE

A laser generator with a laser component provided as part of a wave-energy propagation path terminated at one end by a reflecting surface which is rotatable into another position for reflectively terminating the propagation path. A telescope system is disposed between the rotatable reflecting surface and the laser component. The telescope system increases the effective Q-switching speed by decreasing the amount of rotation necessary in order to change the reflecting angle of the rotatable reflecting surface sufficiently to effect the angular relation to the wave-energy propagation path.

---

This invention relates to lasers, and particularly to so-called resonant laser structures wherein the ratio of wave energy storage to wave energy dissipation per wave energy cycle is shiftable from a low value to a high value at a predetermined finite time after the laser material in the structure has been energized to establish a laserable inversion of energy states thereof. In a more particular sense, the invention relates to an improved laser structure adapted to provide such successive low value and high value ratio conditions with desirably rapid shifting therebetween.

Lasers, sometimes referred to as optical masers, are light-amplifying devices and are specifically adapted to produce high intensity light energy pulses of coherent monochromatic light concentrated in an extremely narrow beam. They find use in diverse fields as sources of such light energy, being employed, for example, in arts wherein it is desired to deliver light energy in intense and highly concentrated form to a relatively small target area.

Light is produced in a laser (an acronym for *l*ight *a*mplification by the *s*timulated *e*mission of *r*adiation) by photonic emission from the active atoms of a body composed of a so-called laser material. This emission occurs incident to the transition of the atoms from an excited, intermediate stable energy level to a lower energy level. Accordingly, laser operation essentially involves exciting active atoms in the laser body to such intermediate energy level, and inducing the emissive transition of the excited atoms in a manner controlled to utilize the light thereby emitted to provide the desired laser output pulse. The nature and number of interlevel transitions which must be effected in a complete atomic cycle of laser operation are dependent on the properties of the particular laser material used.

By way of example, one conventional form of laser structure includes a rod-shaped body composed of a suitable solid laser material, such as synthetic crystalline ruby, surrounded concentrically by, and optically coupled to, a helical gaseous discharge tube (commonly called a flash tube), which is adapted to emit a pulse of light specifically including light in the wavelength of an absorption band of the laser material. When the flash tube is actuated, this light pulse enters the transmissive laser component or body, pumping the body with energy of such wavelength. This pumping excites active atoms in the laser body to shift from an initial low energy level in a series of inter-level transitions, typically involving a first energy-absorptive transition to a very unstable high energy level and an immediately subsequent spontaneous transition (with release of heat energy but presently regarded as non-emissive) from this unstable level to the somewhat more stable energy level referred to above (intermediate in energy level between the aforementioned initial and unstable levels) and from which light-emissive transition occurs. Thus the pumping pulse provides the excitation step in laser operation, creating a very large population of atoms at the intermediate energy level in the laser body. The establishment of this large intermediate-level population is referred to as an inversion of energy states of the body.

For effecting induced light-emissive transition from this level to complete the atomic cycle of laser operation, the laser body of the structure is disposed within or coaxially within a resonant cavity defined between opposed internally reflective cavity ends. Immediately upon the inversion of energy states of the body, individual atoms at the aforementioned intermediate energy level begin to undergo emissive transition spontaneously, shifting to a terminal low energy level (which may or may not be the initial low energy level, depending on the nature of the laser material used) with concomitant emission of light (fluorescence). Since this intermediate energy level is relatively stable in a laser material, such spontaneous emission depletes the enlarged intermediate level population at a comparatively slow rate. However, a portion of the fluorescence emitted by the spontaneous emitting atoms passes through the resonant cavity to the ends thereof, and is thence reflected back and forth through the cavity between the reflective cavity ends, passing and re-passing in multiple bidirectional reflections. This bidirectionally reflected light immediately excites other atoms at the intermediate energy level in such manner as to induce them to undergo emissive transition to the terminal level, producing more light, some of which augments the bidirectionally reflected light in the cavity to induce still further emissive transitions from the intermediate level population. In such fashion, a rising pulse of bidirectionally reflected light quickly develops within the cavity, reaching a quantitatively large value as the induced emissive transition of atoms from the high level population becomes massive. Light of high intensity is accordingly created in one or a succession of light pulses while the pumping light is present, the action continuing until depletion of this population by such transitions restores the laser body to a normal energy state. To permit emission of a portion of the large bidirectionally reflected light pulse or pulses from the laser cavity, one reflective end of the cavity is made partially transmissive. The fraction of the bidirectionally reflected light escaping therethrough constitutes the laser output pulse.

In laser operation of the foregoing character, the energy-pumping pulse is of finite duration. Excitation of atoms to the intermediate energy level occurs throughout this finite pumping period. However, with a laser cavity maintained internally reflective at both ends, the fluorescence emitted by atoms through spontaneous transistion from the intermediate level begins to reflect back and forth in the cavity and in so doing induces emissive transitions of other intermediate level atoms in significant number (initiating the laser output pulse) at a so-called threshold point which is reached substantially before the end of the pumping period. Thus for a considerable portion of the pumping period, the effect of the pumping pulse in augmenting the intermediate-level population is offset by the depletion of the latter population due to such induced transistions, with the result that the magnitude of the intermediate-level population levels off prematurely at a plateau instead of continuing to increase as would otherwise be possible in the absence of induced emission.

Therefore, the same pumping pulse could create a significantly larger maximum intermediate-level population in the laser body if the transition-inducing state created by multiple light reflections could be retarded until a later time in the pumping period. Such delay of the latter state would be desirable, because the magnitude of the peak power attained by the laser output pulse is directly related to the magnitude of this maximum intermediate-level population, and it is often regarded as very desirable to obtain as large a peak power output as possible for optimum laser utility. In other words, the prevention of premature bidirectional light reflections thereby allowing development of a larger intermediate-level population, would enable attainment of a peak power output advantageously greater than that produced with the threshold laser operation described above.

It has been found that the multiple bidirectional reflections of spontaneously emitted light can be delayed in the desired manner by a technique hereinafter referred to as Q-switching. The Q, or quality factor, of the laser resonant cavity is proportional to the ratio of wave energy storage to wave energy dissipation per wave energy cycle therein. When one end of the cavity-providing structure is non-reflective, the resultant structure is said to be in a low Q condition because light emitted by spontaneous transition of intermediate-level atoms in the laser body cannot reflect back and forth in multiple reflections through the structure, but is instead dissipated at the non-reflective end after at most two passes through the structure. In this condition, therefore, bidirectional light reflections cannot build up to induce emissive transition of high level atoms in significant number. Q-switching operation involves maintaining the cavity structure in a low Q condition during that portion of the pumping pulse required for the intermediate-level population to reach a maximum value (which is substantially larger than the plateau value attained in threshold laser operation.) Then, at a time approximating this moment of maximum inversion, the previously non-reflective end of the cavity structure is caused to become reflective, switching the cavity to a so-called high Q condition. Multiple bidirectional reflection of light produced by spontaneous emission in the laser body begins immediately upon such switching, and quickly rises by induced emission from atoms in the very large intermediate-level population previously established. The resultant stimulated laser output pulse is faster in rise time, higher in peak power, and shorter in duration than the pulse produced in threshold laser operation. Such a Q-switching apparatus is described in co-pending United States patent application Ser. No. 212,910, for Laser Q-Switching by Cavity Rotational Reflective Terminus by C. J. Koester and also assigned to the assignee of the present application. However, it is the primary object of the present invention to provide means for further enhancing the rise time, peak power and short duration by faster Q-switching.

Another object of the present invention is to provide a new and improved laser structure adapted to produce an output pulse of advantageously superior peak power.

Still another object of the invention is to effect a higher speed Q-switching operation than has heretofore been possible.

A further object is to provide an improved laser structure of high-speed Q-switching character, adapted to produce an output pulse of extremely fast rise time.

These and other objects are accomplished in an illustrative embodiment of the invention wherein a laser component is provided as part of a wave energy propagation path terminated at one end by a reflecting surface, which is rotatable into and out of a position for reflectively terminating the propagation path. A telescope system is disposed between said surface and said component to increase the effective Q-switching speed by decreasing the rotation necessary for changing the reflecting angle of the surface sufficiently to affect its angular relation to the path and for thereby Q-switching the system.

Further objects and advantages of the invention will be apparent from the detailed description hereinbelow set forth, together with the accompanying drawing, wherein.

Figure 1:
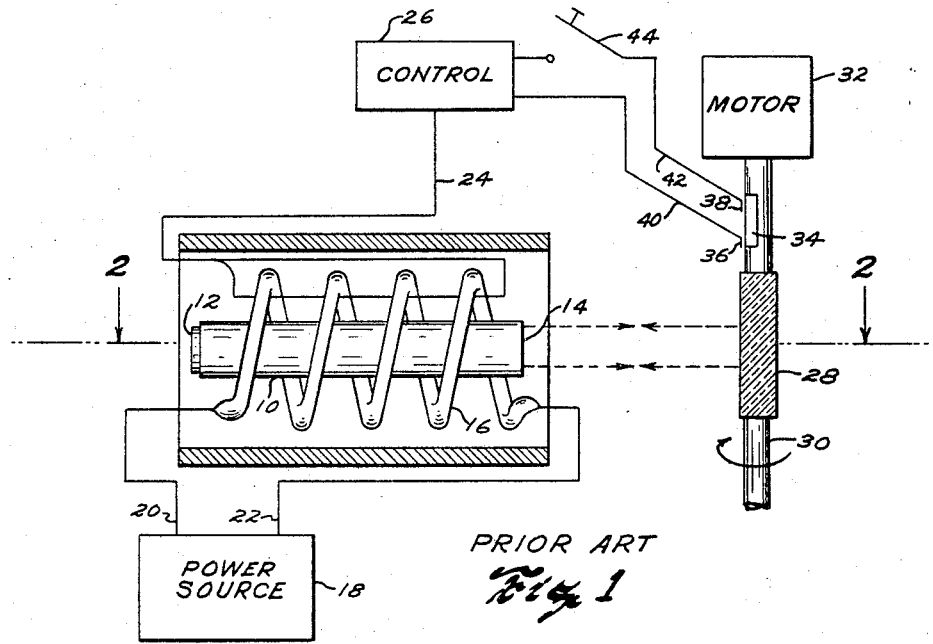
FIG. 1 is a schematic view of an embodiment of the invention of the said co-pending application, showing the relation of elements when the cavity is in high Q condition.

The aforementioned co-pending application describes a laser generator which includes in its illustrative embodiment, as shown in FIG. 1, an active laser component 10 in the form of a cylindrical rod-shaped body of solid laser material (such as synthetic crystalline ruby) having opposed plane end faces perpendicular to its long axis. One end face of the body is silvered as indicated at 12, to make it partially reflective; and the other end face 14 is non-reflective or transmissive. A source of pumping light radiation for the rod 10 is provided, for example, by a helical flash tube 16 disposed to surround the rod concentrically for the entire rod length in spaced relation to the side walls of the rod. This flash tube functions on the gaseous discharge principle and is specifically designed to emit pulses of light including light in the wavelength of an absorption band of the laser material. It is powered from an appropriate power source 18 (of conventional design and including a high voltage source of current and capacitors for energy storage) which is connected through leads 20 and 22 to the opposite ends of the flash tube.

Also shown in the drawing of FIG. 1, according to the aforementioned co-pending application, is a trigger circuit 24 for initiating operation of the flash tube, the trigger circuit being shown as encircling the turns of the helical flash tube and in proximity thereto, powered from a suitable control instrumentality as indicated by reference numeral 26. The characteristics and arrangements of these elements is such that with sufficient charge energy in the power source 18, an electrical pulse applied to the trigger circuit 24 from the control instrumentality 26 initiates a pulse discharge in the flash tube, which produces an input of pumping light energy to the laser rod 10 at a time controlled by the instrumentality 26.

Figure 2:
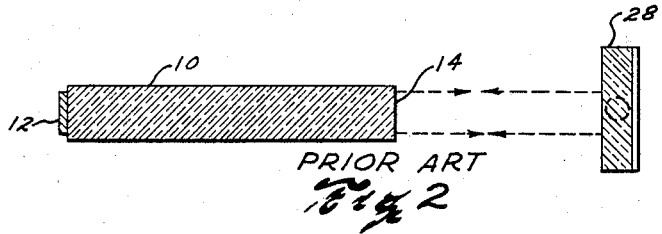
FIG. 2 is a simplified schematic view in section taken along the plane 2—2 of FIG. 1.

The rod 10 is adapted to constitute a segment of a cavity extending from the reflective mirror or rod face 12 (which provides the first terminus of the cavity) coaxially through the rod and beyond the transmissive end face 14. To complete this cavity, the structure of the embodiment of the co-pending application further includes a plane mirror 28 disposed in a position on the cavity axis (in the propagation path) external to the rod 10 and in spaced relation to the end face 14. This mirror is mounted on a shaft 30 which is driven by a suitable motor 32 to affect rotation of the mirror 28 about an axis perpendicular to the axis of the cavity. The rod 10 and mirror 28 are so arranged tht the reflective surface of the mirror is brought into parallel opposed relation to the reflective rod end face 12, intersecting the cavity axis, and perpendicularly thereto once during each shaft revolution. With the shaft in this angular position, the mirror constitutes the second reflective terminus of the cavity, so that the rod and mirror are aligned along a wave energy propagation path. Light passing to the mirror 28 from the rod end face 14 is then reflected by the mirror back through the rod to end face 12, and thus the cavity is in a high Q condition. Such condition is shown in FIG. 2, which is a section taken along line 2—2 of FIG. 1.

Figure 3:
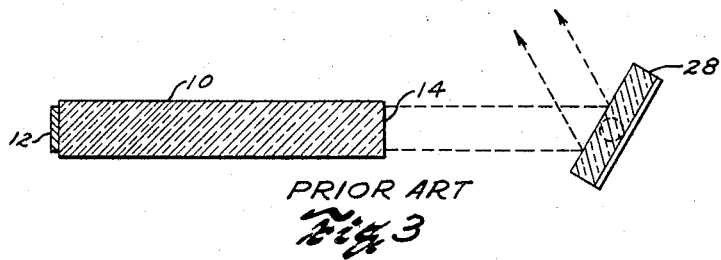
FIG. 3 is another simplified schematic view taken as along the plane 2—2 of FIG. 1 and depicting the relation of elements during the low Q condition of the cycle of laser operation.

The rod 10 and mirror 28 are mutually disposed, so that the high Q condition obtains only when the mirror is within approximately 10 seconds of arc of parallelism ("10 seconds of arc" is not a limitation but illustrative only) with the rod end face 12. It will be understood that bidirectional reflection of light within the cavity between the end face 12 and the mirror 28 can only occur if light emerging from end face 14 is reflected by the rotatable mirror at an angle (herein terminated the reflective angle) small enough to direct the light path of the cavity to the end face 12. At all other times during the cycle of mirror rotation (low Q condition), light passing into the rotatable mirror from the end face 14 is either directed out of the cavity by the mirror, as shown in FIG. 3, or otherwise dissipated by passage beyond the mirror when the thin edge of the mirror is presented to the end face 14. The result of such direction or di.sipation, is that the bidirectional reflection of light in the cavity between the end face 12 and the mirror 28, cannot occur to any significant degree and a so-called low Q condition obtains in the cavity. When the mirror is in the non-parallel position, but still in near parallel relation to the end face 12, the radiating energy will reflect back and forth in a zig-zag path and finally be reflected out of the cavity after a few passes therethrough, instead of making the large number of passes which occur when the mirror and end face are exactly parallel. This phenomenon is referred to as "walk-off" and is a consequence of the principle of geometrical optics governing reflection of light by slightly non-parallel plane mirrors.

The initiation of the pumping light pulse is synchronized with the rotation of the mirror, so that the Q-switching action occurs at a predetermined finite time after the pumping pulse is initiated. As an example of means suitable to provide such synchronized features, FIG. 1 shows a contact plate 34 mounted on the shaft 30 in appropriate angular relation to the mirror 28. Contact points 36 and 38 are disposed to come into contact with the plate 34 simultaneously when the plate is brought into position for such contact by the rotation of the shaft. The points 36 and 38 are connected to the control instrumentality 26 through leads 40 and 42. A manually operable switch 44 is connected in series in this switch circuit. Thus, only when the switch 44 is closed can contact of the points 36 and 38 with the plate 34 complete a circuit, actuating the control instrumentality to energize the trigger circuit 24 thereby initiating the pumping by the flash tube 16. The plate 34 is arranged so that the pulse from the flash tube is initiated when the cavity is in a low Q condition. When the requisite charge has been developed in the power source 18 and the motor 32 is driving the shaft 30 at a predetermined angular velocity, the switch 44 is closed, so that the next time that the plate 34 comes in contact with the points 36 and 38, a circuit is completed to the control instrumentality 26. Immediately the flash tube is actuated and the resultant light directed into the laser rod affects an establishment of a very large intermediate level population of atoms in the rods. Because of the angular relation between mirror 28 and plate 34, the cavity is maintained in a low Q condition during the initial portion of the pumping period, so that, during that period, light emitted in the laser rod by spontaneous transition of atoms from the Q level of energy cannot reflect back and forth in the cavity structure and, therefore, cannot induce emissive transition of other atoms from the intermediate level of energy. As a result, the intermediate or metastable level population increases far beyond the threshold point. At a predetermined time after the initiation of pumping, the mirror is carried by the continuing rotation of the shaft 30 into the requisite parallelism with the rod end face 12 to shift the cavity structure from the low Q condition to the high Q condition as shown in FIG. 2. As soon as the mirror is carried into the position of FIG. 2, light emitted by spontaneous transition of high level atoms in the laser rod begins to reflect back and forth causing induced transition from the greatly enlarged intermediate level population. A portion of this reflected light is emitted from one end of the cavity (for example, through the rod end face 12, if that end face is partially light-transmissive) to provide the laser output pulse. The continuing rotation of the mirror carries it quickly through and beyond the high Q portion of its cycle and the cavity reverts to a low Q condition terminating the output pulse. The rise time of the output pulse is rapid and of short duration because of the rapidity with which the rotating mirror passes into and out of the angular position (plus 10 seconds of arc to minus 10 seconds of arc) in which it provides a high Q condition in the cavity. A short duration of the output pulse is attainable, because the portion of the mirror rotation cycle in which the mirror is in near parallel relation (within about 10 seconds of arc) to the end face 12 is proportionately very small, especially because of the aforementioned "walk-off" effect.

Figure 4:
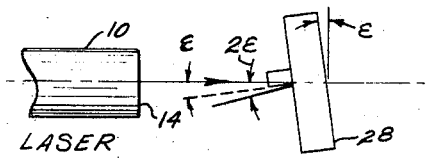
FIG. 4 is a schematic representation of the effect of angular displacement of the mirror of FIG. 1 on the angular displacement of a reflected ray therefrom, using the system shown in FIG. 1.

From a consideration of geometrical optics and reference to FIG. 4, it will be understood that for a given angle $\epsilon$ of rotation of the mirror 28, the reflective angle $2\epsilon$ for light reflected once from the rotating mirror changes twice as fast as the angular movement $\epsilon$ (about 10 seconds of arc) of the mirror. The present invention provides a means for causing the angular reflection $2\epsilon$ (about twenty seconds of arc) of the light ray at the entrance to the rod at end face 14 with less of an angular rotation $\epsilon/M$ of the mirror, where M is the magnification of a telescope. Such means may be in the form of a telescope system, such as that shown in FIG. 5, wherein a schematic representation of a laser system with a telescope in the propagation path is shown according to the present invention. According to that figure, if the lenses of the telescope are chosen so that the first lens 50 has a focal length of $f_1$ and the second lens 52 has a focal length of $f_2$, the magnification M of the teleshope system will be a ratio of the two focal lengths $f_2/f_1$, and for an angle of rotation $\epsilon/M$ of the mirror 28, the angle of reflection of a light ray 54 exiting normal to the end face 14 of the laser will be returned to the end face 14 at an angle $2\epsilon$ with the normal at its entrance to end face 14. The geometrical optics involved with the phenomenon illustrated in FIG. 5, may best be explained by a specific example involving a telescope system with a first lens 50 having a focal length $f_1$ of one unit and a lens 52 having a focal length $f_2$ of two units. If the magnification is equal to the ratio of focal lengths for the two lenses, the magnification in the exemplary system is equal to two. Therefore, if the mirror is rotated by an angle of $\epsilon/M$, the reflected light ray 56 from the mirror is at an angle of $2\epsilon/M$ or $2\epsilon/2$ or $\epsilon$ with the normal. When this reflected light ray 56 returns through the telescope system to the end face 14 of the laser, it is at an angle of $2\epsilon/M \times M$ or $2\epsilon$ with the normal to the laser end face 14. It is seen then that the telescope system comprising lenses 50 and 52 provides a means by which a smaller rotation ($\epsilon/M$ as compared with $\epsilon$) produces a re-entry angle $2\epsilon$ at the end face 14 of the laser that is equal to the entry angle $2\epsilon$ for the system of FIG. 4, wherein an angular rotation of $\epsilon$ of the mirror is made. Also, less of an angle of rotation of the mirror 28 is subtended during the high Q condition than with the system of FIG. 4 (10 seconds of arc compared to 20 seconds of arc with $M=2$).

Figure 5:
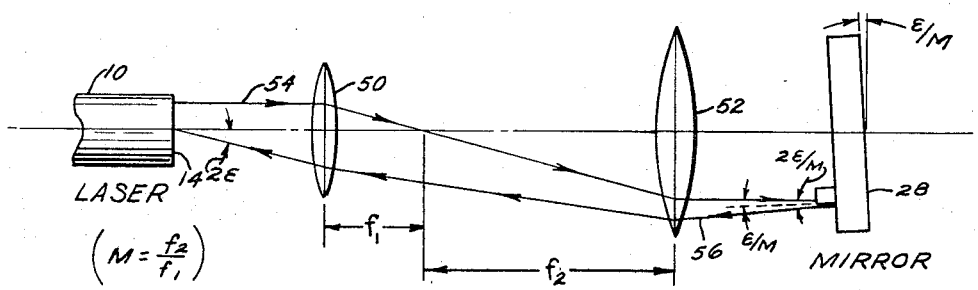
FIG. 5 is a schematic representation of a laser system with a telescope inserted in the propagation path according to the present invention, showing the effect of angular displacement of a rotating terminus of the cavity on the angular displacement of a reflected ray therefrom.
Figure 6:
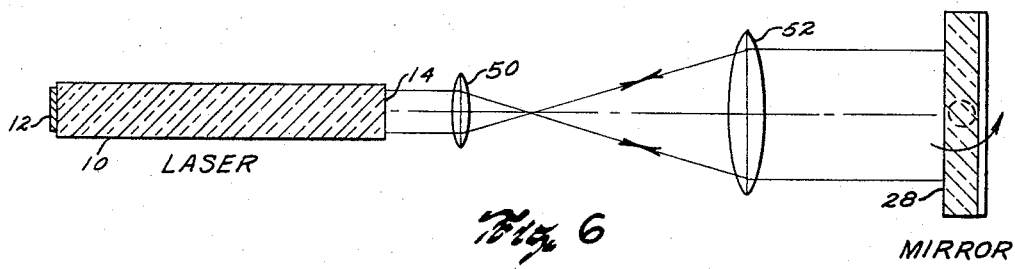
FIG. 6 is a partial schematic view of a laser system and propagation path with a telescope inserted therein according to the present invention.

A system according to the principles discussed with reference to FIG. 5 is shown in FIG. 6 in a partially sectioned schematic representation wherein a laser rod 10 having partially reflective end face 12 and transmissive end face 14 is used as a segment of a laser radiation propagation path with the rotatable mirror 28 providing the cavity terminus for the path. Lenses 50 and 52 are disposed between the end face 14 of the laser and the rotatable mirror 28 to provide a telescope system, whereby the magnification of the exit light from end face 14 of the laser rod and its reflection (if any) from mirror 28 is performed. In this way, a slight rotation of the mirror 28 is involved in rotating the mirror through the high Q condition previously discussed. Also a faster rise time is provided to go along with a shorter pulse duration, since the entrance to high Q condition (high Q position of the mirror) is made faster by the fact that less of a rotation is necessary to enter that condition than with the embodiments described with reference to FIGS. 1 through 4.

Figure 7:
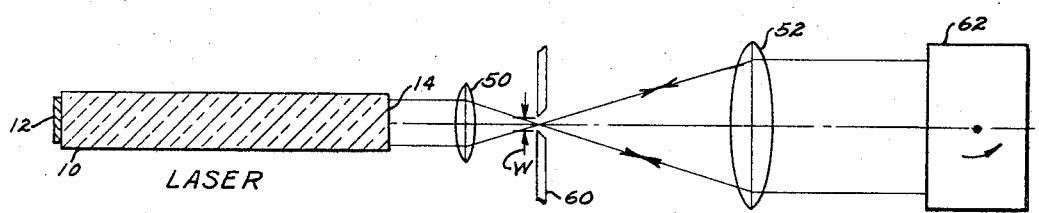
FIG. 7 is a partial section view of an alternate embodiment of the invention using a prism as the cavity terminus and a slit in the telescopic system for mode selection.
Figure 7A:
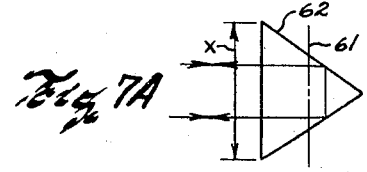
FIG. 7A is a side view of the prism of FIG. 7 showing ray propagation therethrough.

An alternative embodiment of the present invention is shown schematically in partial section view in FIG. 7, wherein two optional improvements are made to the configuration of FIG. 6. One such improvement involves the use of an apertured plate or slit means 60 for mode selection, which effect is described in copending U.S. patent application Ser. No. 371,978 for Improvements in Laser Apparatus by E. Snitzer and also assigned to the assignee of the present application. The slit, with a width $w$, provides even faster Q-switching by cutting down the angular limits of the position of the miror during high Q condition by a factor of plus or minus the spread of the beam at the focal point (in radians) times the focal length of the second lens divided by the width $w$. Furthermore, the rotatable prism 62 is provided in place of the rotatable mirror 28 to eliminate the possibilities of the attendant high light level of laser output damaging a metallic mirror surface. The side view of the rotatable prism 62 and its axis of rotation 61 are shown in FIG. 7A, which also depicts the mirroring capabilities of the prism. It is recommended that a 45°–90°–45° prism be used in this configuration, but the scope of the present invention should not be limited thereby.

Figure 8:
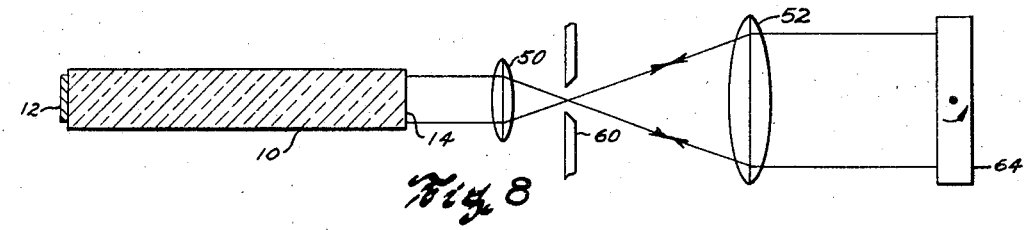
FIGS. 8 and 8A are schematic views of a further embodiment of the invention according to FIG. 7, but with a narrow prism as the cavity terminus.
Figure 8A:
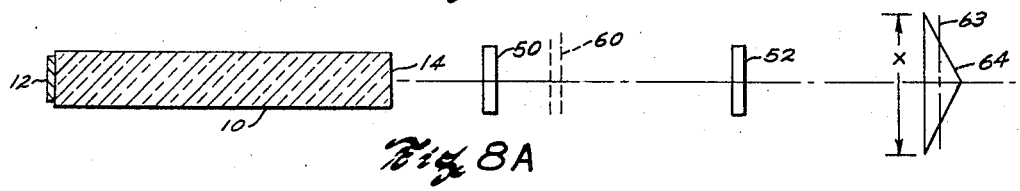

A further alternate embodiment of the present invention is shown in FIGS. 8 and 8A wherein the rotatable prism 64 is made narrower than the prism 62 of FIGS. 7 and 7A. FIG. 8A is a side view representation of the embodiment of FIG. 8, and shows that the prism 64 is of the same width $x$ as the prism 62, but of a smaller mass, since it is narrower. The prism of FIGS. 8 and 8A can, therefore, be rotated about its axis 63 more easily than the prism of FIGS. 7 and 7A. The use of cylindrical optics can further enhance the embodiment of FIG. 8.

Figure 9:
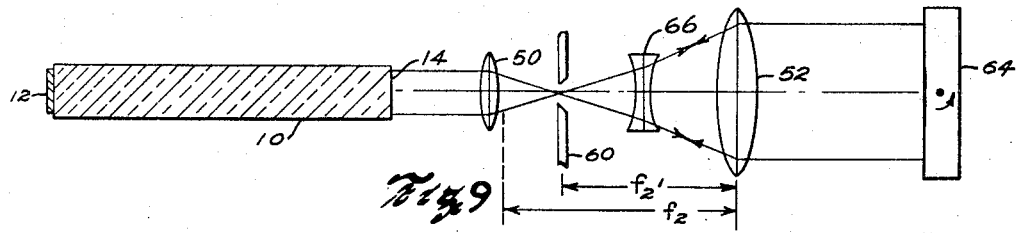
FIG. 9 is still another embodiment of the invention using an inverted telephoto system between the laser end and rotatable cavity terminus.

It is well known in the laser art that extremely short laser pulses are particularly useful, and to obtain such pulses, a short transit time of light in the laser cavity is an important consideration. In FIG. 9, an embodiment of the present invention is shown wherein the total path length between reflectors is reduced by employing an inverted telephoto lens system including negative lens 66. That is, the physical distance $f_2$, from the slit means 60 to the final lens 52 is considerably less than the effective focal length $f_2$.

Figure 10:
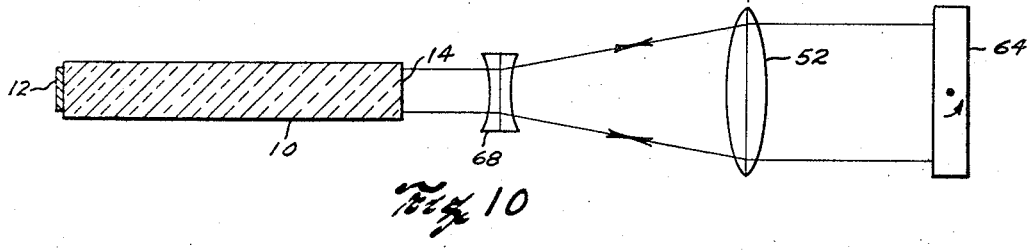
FIG. 10 is a schematic representation of a further embodiment of the invention using a Galilean telescopic system between the laser end and cavity terminus.

FIG. 10 is a modification of the present invention using a Galilean telescope system, wherein no focussed image is produced, but the advantages of FIG. 1 are obtained with a shorter optical path. In this embodiment, the laser light exits from end face 14 through negative lens 68, which diverges the light to fill lens 52, which, in turn, collimates the light before it is incident on prism 64.

Figure 11:
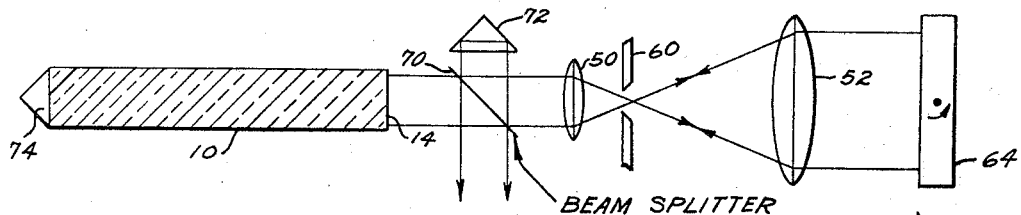
FIG. 11 is a schematic representation of the invention according to FIG. 8 wherein output means are provided for obtaining an output from the system; and, FIG. 11A is a side view of the rotatable prism (cavity terminus) of FIG. 11 showing more clearly the use of a prism for the embodiment shown therein.
Figure 11A:

FIGS. 11 and 11A illustrate the embodiment of FIG. 8 with alternate means for obtaining an output from the device. The beam splitter 70 reflects part of the light incident from the end face 14 of the laser rod in a downward direction. Part of any laser light incident to the beam splitter 70 after reflection from prism 64 is reflected upward and, in turn, totally reflected by the small prism 72, from where it is again incident on the beam splitter. That portion, which is now transmitted, combines with the above-mentioned reflected part to constitute the output of the system. It should be noted that a substantially totally reflecting prism 74 is disposed at the end of the laser rod 10 opposite to the end face 14. The use of such a prism is advantageous over a mirror in eliminating the possibility of high light level damaging a metallic mirror surface; and the partially transmitting characteristic of the mirror used in other embodiments is made unnecessary by the separate output means just described.

The advantageous rapidity of Q-switching according to the present invention may best be understood by reference to a specific numerical example of laser operation with the elements of structure positioned and dimensioned (assuming a telescope with $M=2$) so that a high Q condition obtains in the cavity only when the mirror 28 is within 5 seconds of arc of parallelism with the end face 12, the high Q condition obviously subsists only during mirror rotation through 10 seconds of arc. Thus, if the mirror is rotated at an angular velocity of 16 revolutions per second, one complete revolution occurs in .0625 second, and the high Q portion of this revolution (in which the entire output pulse occurs) lasts approximately one-half of a micro-second. In other words, with such operation, the rise time of the laser output pulse is necessarily less than $.5 \times 10^{-6}$ seconds.

It should also be explained that the maximum angle of entrance of the light to the component, after reflection from the rotating reflector, can be more than five minutes of arc, depending upon the rotating reflector-to-component distance and the application. The ten seconds of arc used in the example is merely for illustrative purposes only. Furthermore, the period of time for Q-switching can be reduced by either increasing the speed of rotation of the reflector for a given magnification, or increasing the magnification, which might even allow a decrease in the speed of rotation of the reflector to avoid straining the motor.

I claim:
1. A laser generator comprising:
   an active laser component having opposite ends disposed within an optically resonant cavity;
   means for pumping said component so that a population inversion results thereby producing a negative temperature medium and means for emitting resulting laser light energy from said optically resonant cavity, said laser component having a first reflector proximate to one end and a second reflector spaced from the opposite end;

means for rotating said second reflector;

means for synchronizing said pumping means and said second reflector for attaining a maximum population inversion in said laser component; and a telescope system, said telescope system having a power greater than unity when viewed from said laser component toward said second reflector, said telescope system being disposed within said cavity between said second reflector and said opposite end.

2. A laser generator as set forth in claim 1 wherein said telescope system comprises a Galilean telescope system including a first negative lens and a second lens.

3. The laser generator as set forth in claim 1 wherein said second reflector is a substantially totally reflecting prism.

4. The laser generator as set forth in claim 1 wherein said telescope system comprises first and second lenses, spatially disposed within said cavity along the cavity axis by an amount equal to the sum of the focal lengths of said lenses, so that the focal points of said lenses are a common point.

5. The laser generator as set forth in claim 4 wherein an apertured plate is provided at the common focal point of said first and second lenses.

6. The laser generator as set forth in claim 5 wherein said second reflector is a substantially totally reflecting prism.

7. The laser generator as set forth in claim 6 wherein a negative lens is disposed between said apertured plate and said second lens for providing a shorter physical distance for light propagation between said aperture plate and said second lens than the effective focal length of said second lens.

8. The laser generator as set forth in claim 6 wherein a beam splitter is disposed between said first lens and said opposite end and a third reflector is so disposed with relation to said beam splitter that part of the light reflected from said second reflector is reflected by said beam splitter to said third reflector, and part of the reflected light from said third reflector is transmitted through said beam splitter as an output of said generator with the remaining reflected light from said third reflector being reflected by said beam splitter through said first lens to said second reflector.

9. The laser generator as set forth in claim 8 wherein said first reflector is a substantially totally reflecting roof prism.

10. The laser generator as set forth in claim 8 wherein said third reflector is a substantially totally reflecting prism.

11. A laser structure comprising:

a laser component providing a segment of a wave-energy propagation path;

means for energizing said component to establish an inversion of energy states and thereby produce a negative temperature medium and means for emitting resulting laser light energy from said laser component;

a first wave-energy reflector terminating a first end of said propagation path;

means for terminating a second end of said propagation path including a second wave-energy reflector, rotatable to undergo angular displacement about an axis perpendicular to the axis of said laser component into and out of position reflectively terminating said second end of said propagation path;

means for effecting said angular displacement of said second wave-energy reflector successively into and out of said position to control the value of the ratio of wave-energy storage to wave-energy dissipation per wave-energy cycle within said path for wave-energy propagation along said path; and a telescope system, said telescope system having a power greater than unity when viewed from said component toward said second wave-energy reflector, said telescope system being disposed between said second reflector and said laser component.

12. The laser structure as set forth in claim 11 wherein said telescope system is a Galilean telescope system including a first negative lens and a second lens.

13. The laser structure as set forth in claim 11 wherein said second wave-energy reflector is a substantially totally reflecting prism.

14. The laser structure as set forth in claim 11 wherein said telescope comprises first and second lenses, spatially disposed along said path by an amount equal to the sum of the focal lengths of said lenses, so that the focal points of said lenses are a common point.

15. The laser structure as set forth in claim 14 wherein an apertured plate is provided at the common focal point of said first and second lenses.

16. The laser structure as set forth in claim 15 wherein said second wave-energy reflector is a substantially totally reflecting prism.

17. The laser structure as set forth in claim 16 wherein a negative lens is disposed between said apertured plate and said second lens for providing a shorter physical distance for light propagation between said apertured plate and said second lens than the effective focal length of said second lens.

18. The laser structure as set forth in claim 16 wherein a beam splitter is disposed between said first lens and said component so that the part of the light reflected from said second reflector is reflected by said beam splitter as the output of the laser structure.

19. The laser structure as set forth in claim 16 wherein a beam splitter is disposed between said first lens and said component and a third reflector is so disposed with relation to said beam splitter that part of the light reflected from said second reflector is reflected by said beam splitter to said third reflector, and part of the reflected light from said third reflector is transmitted through said beam splitter as an output of said laser structure with the remaining reflected light from said third reflector being reflected by said beam splitter through said first lens to said second reflector.

20. The laser structure as set forth in claim 19 wherein said third reflector is a substantially totally reflecting prism.

References Cited

UNITED STATES PATENTS

| | | | |
|---|---|---|---|
| 3,274,512 | 9/1966 | Okaya | 331—94.5 |
| 3,281,712 | 10/1966 | Koester | 331—94.5 |
| 3,315,177 | 4/1967 | Benson | 331—94.5 |

OTHER REFERENCES

Daly et al.: An Improved Method of Mechanical Q-Switching Using Total Internal Reflection, Applied Optics, vol. 3, No. 9 (September 1964), pp. 1063–1066.

JEWELL H. PEDERSEN, Primary Examiner.

WILLIAM L. SIKES, Assistant Examiner.

U.S. Cl. X.R.
350—7, 275